United States Patent [19]

Higgins et al.

[11] Patent Number: 4,628,951

[45] Date of Patent: Dec. 16, 1986

[54] LIQUID LEVEL DETECTION SYSTEM FOR HIGH TEMPERATURE OR PRESSURE ENVIRONMENTS

[75] Inventors: James H. Higgins, Chesapeake City; Woodford A. Bowe, Rising Sun, both of Md.; Robert Laragione, Christiana, Pa.

[73] Assignee: Chemical Data Systems, Inc., Oxford, Pa.

[21] Appl. No.: 567,543

[22] Filed: Jan. 3, 1984

[51] Int. Cl.[4] ........................ G05D 9/12; F16K 31/02

[52] U.S. Cl. .................................... 137/2; 73/304 R; 137/392; 361/178

[58] Field of Search .......................... 137/386, 392, 2; 73/304 R; 307/117, 118; 361/178

[56] References Cited

U.S. PATENT DOCUMENTS 2,698,539 1/1955 Gridel et al. .................... 73/304 R
2,761,320 9/1956 Duntley ............................ 73/304 R
3,545,482 12/1970 Paull .................................. 137/392
3,814,146 6/1974 Mesh .................................. 137/392
4,313,228 1/1982 Berstein .............................. 137/392

*Primary Examiner*—George L. Walton
*Attorney, Agent, or Firm*—Nelson E. Kimmelman; Louis Weinstein

[57] ABSTRACT

An electromagnetically actuatable probe is inserted in a vessel containing a body of liquid and in which high pressure, high temperature, corrosive, or other hostile conditions exist. Pulses are transmitted to the probe within a predetermined range of frequencies which include the normal resonant frequency of the probe. Return signals are generated by the probe between the times the transmitted pulses are sent. These return pulses are processed to produce signals which are a function of the level of the liquid that are then employed to control the discharge of the liquid or used by another utilization circuit.

18 Claims, 5 Drawing Figures

LIQUID LEVEL DETECTION SYSTEM FOR HIGH TEMPERATURE OR PRESSURE ENVIRONMENTS

BACKGROUND OF THE INVENTION

1. Field of the Invention

This invention relates to apparatus for ascertaining a predetermined liquid level and in particular to such apparatus especially adapted for use in hostile environments, i.e., extremes of temperature or pressure.

2. Prior Art

In certain chemical laboratory or analytical apparatus, gases or vapors are passed through vessels in which very high temperatures or very high pressures exist or in which corrosive or other hostile conditions are found. Within those vessels, as a result of condensation or chemical reaction, for example, liquid drops from the gases or vapors form a body of liquid. From time to time it is desired to remove the accummulated liquid through an outlet valve in the vessel when a predetermined volume of it has been collected. In order to accomplish this automatically, it is highly useful to have associated with it, either within or without, apparatus for automatically detecting when the liquid attains a predetermined level. It is desirable to remove the accumulated liquid without disturbing the flow of the gases through the vessel.

In a typical example, there may be a flow of gases through a microreactor or micropilot system such as the Model 800 or Model 8000 marketed by Chemical Data Systems of Oxford, Penna. Through the micropilot or reactor vessel there may be a flow of gases into contact with a catalyst for generating a predetermined product or products. Sometimes it is not known how much of the product will be in the liquid phase relative to the amount in the gas phase. Sometimes gases or vapors will condense on the inner walls of the vessel. The balance of the system following the reactor may not be able to handle the liquid phase component. If the vessel is equipped with an automatically-operated outlet valve and some means for generating a signal when the liquid body rises to a predetermined level, that signal may be used to actuate the valve to remove a certain amount of the liquid in the body. The gas phase components may continue to pass through the vessel for further analysis downstream.

In the past, there have been a number of approaches to detection of liquid level. One of them involves the detection of a change in capacitance as the liquid rises to the predetermined level. This type of approach is not useful with certain types of liquids such as paraffines whose dielectric constant is extremely high. Nor is it practical when the gases in the vessel are subject to extreme or widely-varying pressures. The presence of bodies of viscous liquids may also impair the efficiency or even the utility of capacitance-type liquid level detectors.

Another known approach is a light or optical detection system. If this type of detection system is located within the vessel, its efficacy can be seriously impaired by the production of tarry or similar types of light-obstructing substances within the vessel. If the optical detection system is located externally, such types of material may condense or otherwise accumulate on the inner surface of the vessel and similarly obstruct accurate optical detection of the liquid level.

Still another approach is to use radioactive materials which emit sensing rays. The trouble with them is that they are very expensive and require approval by appropriate government authorities.

Another detection system involves the use of sonic or ultrasonic detectors. A sonic emitter may be placed within the vessel so that its waves are reflected back to a receiver from the top surface of the liquid body. However, different gases in such a vessel differently affect the velocity of the propagation of the sound waves leading to inaccurate readings. Variations in temperature and pressure may likewise introduce variables in the sensing system thereby making it difficult to use this approach where the ranges of such variations and the concentration of the various gases may not be known in advance.

The use of a float-ball assembly as the detection system within a highly-pressurized vessel also is not practical, because any device that would float on the surface of liquids having widely-varying densities must be very light and delicate and therefore could not withstand those high pressures.

Another alternative is to use a thermal detector which involves the placing of a heat generator within the liquid and a plurality of heat sensors located above it. However, since many vessels are associated with programmed heating cycles, this system cannot easily accommodate them. If the temperature is cycled, it is impossible to get the differential between the temperature of the liquid and the temperature of the gas necessary for the sensors to be operative. Sometimes the gas can be hotter than the liquid or vice-versa making detection accuracy impossible.

Other systems employ two metallic probes connected to external electrical circuits and depend upon the conductivity of the liquid to complete a circuit. They unfortunately are of value only with liquids that are electrolytes but there are many liquids which are not.

An approach that has proved useful for detecting the level of non-liquids such as granular, powdered or particulate material, e.g., grain or pelletized plastic material is the Endress and Hauser. piezoelectric level switch Model LSM 1700. It employs one or more vibrating elements whose vibrations are damped as they come into contact with the pellets so that the decrease in the amplitude of the vibrations can be sensed. If this type of detector is employed with certain liquids, the vibrating elements may acquire a coating of the liquid and cause the resonant frequency of the elements to change. If the amount of the change in resonant frequency is not known in advance, compensation in the associated circuitry is not practical. This vulnerability to frequency variations renders such types of detection systems of little value for detecting liquid levels.

It is therefore among the objects of the present invention to provide:

(a) A system and method for detecting a predetermined level of liquid, especially in a hostile environment.

(b) A system and method for detecting a predetermined level of a liquid which is not an electrolyte.

(c) A liquid level detecting system and method capable of being used with enclosures subjected to programmed heating or pressure cycles.

(d) A liquid level detecting system for regulating the release of a liquid from an enclosure in which there are extremes of heat or pressure.

(e) A liquid level detecting system involving a probe having a vibrating element whose natural resonance frequency may be affected by hostile environments.

BRIEF SUMMARY OF THE INVENTION

Apparatus and method for causing a vibrating probe in a hostile environment within an enclosure to vibrate over a range of frequencies including the resonant frequency of the probe. Return signals received from the vibrating probe when not electrically actuated are then used to derive a signal indicative of the height of the liquid, said signal being usable for any desired purpose such as controlling the outflow of the liquid from the enclosure.

DETAILED DESCRIPTION OF THE DRAWINGS

Figure 1:
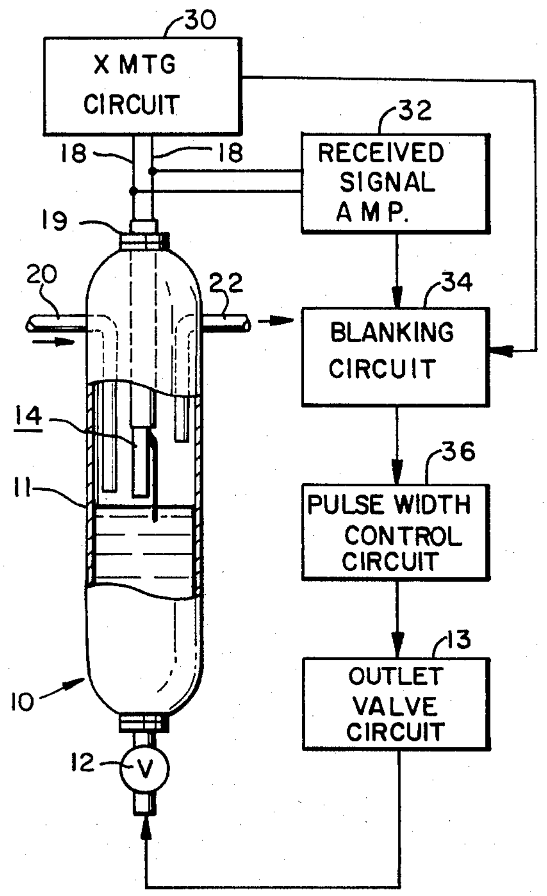
FIG. 1 is a schematic and block diagram of the overall system in accordance with the present invention.

FIG. 1 shows the overall liquid-level detection system indicated generally at the numeral 10 in accordance with the present invention. It comprises a high pressure or high temperature vessel 11 made of stainless steel, for example, having an automatic, solenoid-operated outlet valve 12 at its lower end which is electrically controlled by an outlet valve driving circuit 13. Suspended from and passing through an aperture in a closure 19 at the top end of the vessel 11 is a probe indicated generally at numeral 14. The probe comprises a stainless steel tubular portion 15 whose lower end is sealed by a plug 16 welded into it. The upper end of the tubular portion 15 is sealed with an aluminum plug 17 having a longitudinal flat 17*a* formed on one side to permit the entry into the tube of two ceramically-coated nickel wires 18. The top end of the tubular portion 15 is passed through closure 19 of the pressure vessel so that the interior of the tube 15 is not exposed to the atmosphere within the vessel but rather to the outside ambient atmosphere. The sides of the pressure vessel also have apertures permitting the introduction of an inlet gas-carrying tube 20 located about two-thirds down the top and an outlet gas-carrying tube 22 located near the top of the vessel.

Figure 2:
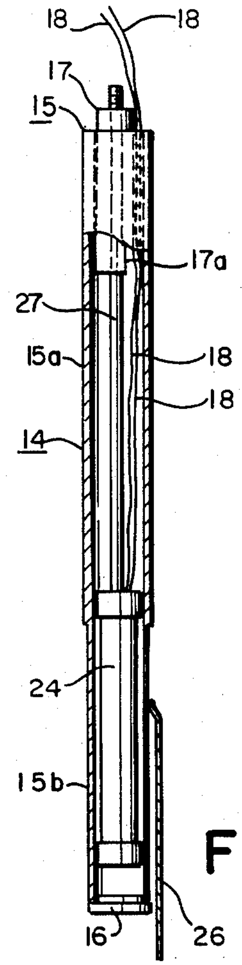
FIG. 2 is an enlarged side elevation view of the probe shown in FIG. 1.

As shown in FIG. 2, the wires 18 coming out of the top are connected to a single coil 24 shown in the bore of the tube 15, the coil being wound with the same material as the wire leads. The coil is screwed to the lower end of an aluminum rod 27 threaded at both ends. Its upper threaded end is screwed into an axial threaded aperture formed in the plug 17. The tube 15 has an upper portion 15*c* which is slightly larger than its lower portion 15*b*. There is also a flat 15*c* formed toward its lower end to the top of which there is welded the actual vibrating element 26. It is generally flat and rectangular and is made, for example, of a magnetic stainless steel to resist corrosion. One illustrative embodiment of the probe employs a tube five inches long made of stainless steel and having an element 1½ inches long by 0.125 inches wide. In certain applications, the entire probe may be disposed within the bore of a larger metal tube whose lower end is open.

The wire leads from the coil are connected to a transmitting circuit 30 which generates a series of pulses at, for example, a nominal frequency of 40 Hertz. The circuit 30 is always on and, in accordance with the present invention, its output pulses are swept in frequency over a band comprising the nominal frequency ±20%. The transmitting circuit 30 supplies, for example, one-half amp pulses to the coil 24 of the probe.

After the transmission of each pulse to the coil, the element is made to vibrate so that return pulses at 400 Hertz are generated by the movement of the magnetic element relative to the coil. These return pulses are fed back from the probe through the wires 18 to a received signal amplifier 32 which is constructed to amplify the return signals, suppress "spikes" and noise (such as 60 Hertz interference), limit the pass band of the return signal, reduce oscillations and produce an output analog signal. The latter is applied for further processing to a blanking circuit 34. Since the amplifier 32 is always on, the function of the blanking circuit is to block any input to the amplifier 32 while the pulses are being transmitted to the coil from transmitter 30 and for a predetermined time thereafter. During this predetermined time, only a selected number of the return pulses, for example, 1 out of 10, are enabled to be applied to the input of amplifier 32. By so doing, it eliminates the application to the next stage of unstablized portions of the amplified analog return signal.

The blanked analog signal is then applied to the pulse width control circuit 36 which provides for storage of the peaks of the blanked analog signal to form another analog signal which is applied to a special analog-to-digital converter in circuit 36. The latter produces an output pulse whose width is a function of the height of the liquid 13 in the pressure vessel. If the amplitude of the received signal is lower, this means that the element 26 is having its motion in the liquid damped more because the liquid level is high. As a result, the converter generates a wider pulse which, when transmitted to the outlet valve 12, permits more of the liquid to escape. Conversely, if the amplitude of the received signal is higher, this means that the body of liquid is not damping the motion of the element as much because the liquid level is low. As a result, the converter generates smaller amplitude pulses to open the outlet valve 12 less. If there is no body of liquid, no width-modulated pulses will be produced. The width-modulated pulses are then applied to an outlet valve driver 13 which actually energizes the outlet valve 12.

FIG. 4

The transmitting circuit 30 comprises the basic frequency generator U3 which produces a frequency of 40 Hertz. This nominal frequency of U3 is determined by resistors R25 and R26 as well as capacitor C12. However, in order to provide the sweep frequency which is an essential part of our invention, there is also provided the integrated circuit U10 which produces an output analog voltage at its pin 2. The analog voltage is buffered in chip U6 and applied to pin 5 of chip U3. The frequency at which U10 sweeps is determined by the values of R27, R28 and C13. In a typical case, it will operate to cause U3 to produce output frequency signals in a swept band of 32–48 Hertz over a cycle of 2 seconds.

The analog signal produced by U10 is applied to pin 3 of integrated circuit U6 which is an operational amplifier follower and thence to pin 5 of U3 for controlling the output frequency of the latter.

Capacitor C14 is provided to stabilize the frequencies in the output signal of U10.

Figure 3:
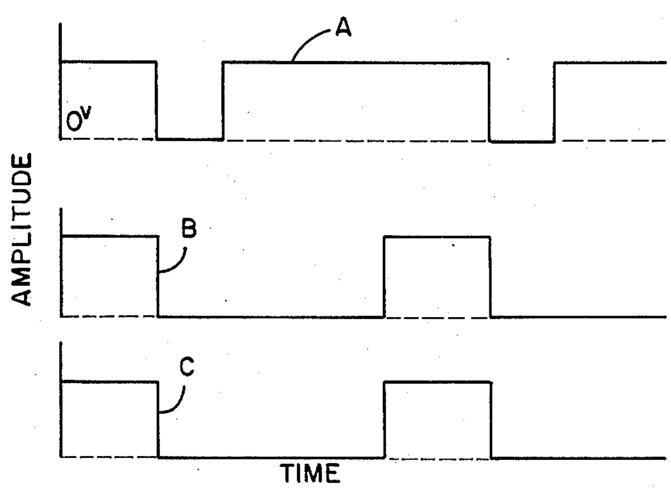
FIG. 3 is a group of waveforms which assist in explaining the operation of the overall system.

Integrated circuit U3 produces digital pulses at "A" [FIG. 3] which are fed through resistor R6 to the base of transistor Q1. The latter provides a one-half ampere signal in its emitter-collector circuit that passes through isolation didode CR5 to the coil L1 that excites the sensor 26. The excitation of the coil L1 may result in the production of unwanted spikes which are effectively removed by diodes CR2 and CR3. Otherwise, these spikes would be present in the input to the received signal amplifier 32 which would cause disturbances. Diode CR4 is for isolation purposes.

The received signal comes from the coil L1 through resistor R1 and is applied to pin 3 of integrated circuit U1 which is an amplifier in the common mode configuration which helps to eliminate 60 cycle noise. The amplitude of the received signal may be on the order of one millivolt. The output of amplifier U1 is applied to pin 3 of bandpass amplifier U4A. However, it passes through a spike-limiting bandpass filter which is constructed to permit frequencies in the 320–480 Hertz per second to pass. The bandpass filter comprises C8, C9, R12, R11, C27, R13, R14, R15, C25, C26 and C38. Diodes CR35 and CR36 are provided for preventing spikes generated by the pulsing of the coil L1 from interfering with the operation of the bandpass amplifier and circuit. The output of amplifier U4A is applied via capacitor C38 and R72 to pin 6 of another stage of amplification in integrated chip U4B. R72 determines the gain of U4B together with R76. Capacitor C34 is provided to eliminate oscillations. Resistor R74 is a bias resistor for U4B.

The output of U4B is applied via DC isolating capacitors C36 and resistor R17 to pin 2 of chip U7A. C36 also helps to prevent drift in the final amplifying stage U7A. The potentiometer R23 and resistor R17 cooperate in determining the gain of U7A and capacitor C39 eliminates oscillations from interfering with the operation of the final amplifying stage.

Also connected to U7A at pin 3 is R18 and potentiometer R21. With this adjustable circuit, it is possible to set the operating level, i.e., the offset from 0 volts, at which amplifier U7A operates. This circuit is useful in setting that operating level below the noise level regardless of its source.

The output of the final amplifying stage U7A of the received signal amplifier is applied via a half-wave rectifying diode CR10 to pin 1 of solid state switch U9A which does the actual blanking. See "C" FIG. 3, Part C.

The function of the blanking circuit 34 is to prevent any of the return signal constantly being received and amplified in amplifier 32 from being applied to the pulse width control circuit 36 during a predetermined interval. That interval starts at the beginning of the pulse transmitted to the coil L1 from transmitter 30 and continues to a predetermined time after the end of that pulse. By so doing, any input to the pulse width control circuit is blocked during the transmitted pulse interval as well as a short time thereafter. Otherwise, because of the excitation of the coil L1 by the transmitted pulse, the received signal would be unstable and contain undesired components due to ringing or other effects. During that time interval, solid state switch U9A would be opened because of a low voltage condition at pin 13. However, after a time when the received signal should have become stabilized, the blanking pulse ends and the pin 13 goes high closing switch U9A and permitting the desired stabilized portions of the received signal to be applied to the pulse width control 36.

Figure 4:
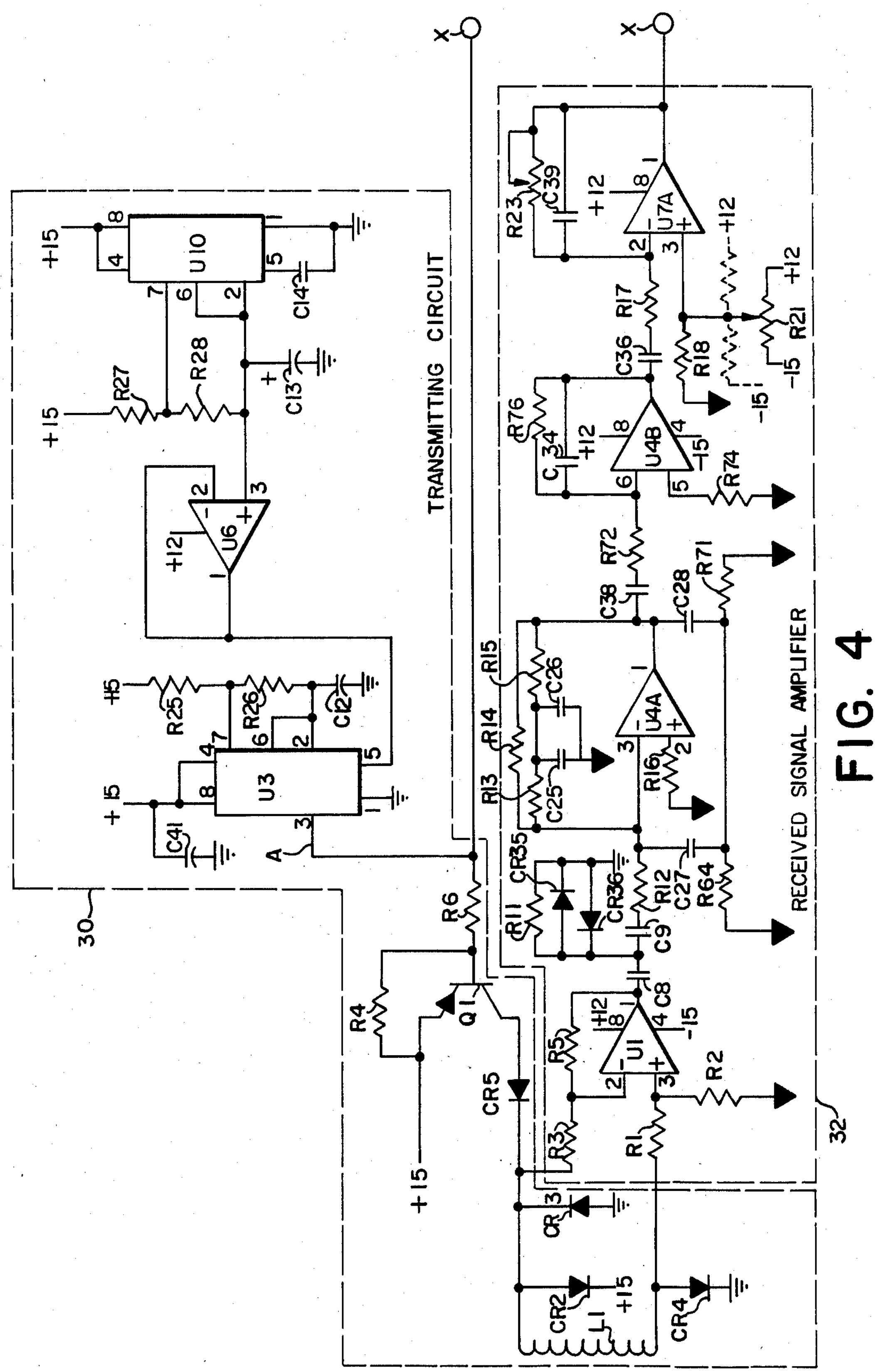
FIG. 4 is the first part of a schematic diagram of the electronic circuits corresponding to the blocks shown in FIG. 1.
Figure 5:
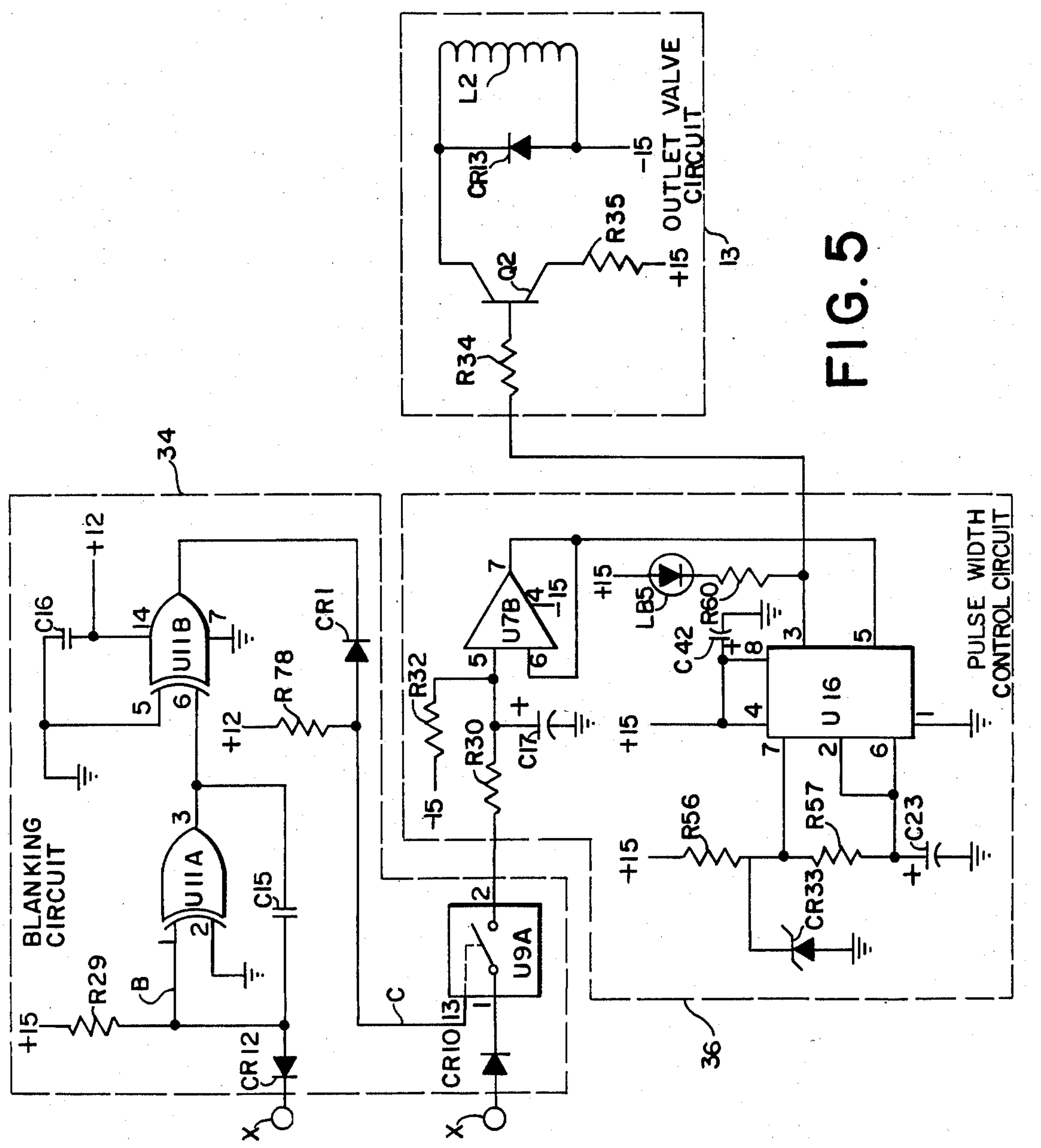
FIG. 5 is the second part of a schematic diagram of the electronic circuits corresponding to the blocks shown in FIG. 1.

The circuits which cause the application of a 0 or 1 at pin 13 of U9A include the exclusive OR chips U11A and U11B connected and used essentially as a one-shot multivibrator. The signal at A is transmitted via an isolating diode CR12 to pin 1 of U11A. The waveform of the signal at B is shown in FIG. 3, part B. That signal is the trigger signal for causing the production of the leading edge of the blanking pulse. The period at which chips U11A and U11B operate is determined by a time constant circuit involving R29 and C15. Pin 2 of U11A is grounded to provide the proper polarity of its output signal at pin 3. The signal at the latter is applied to pin 6 of U11B whose output is applied via diode CR1 (see waveform C in FIG. 4) to pin 13 of U9A which determines whether the latter is open or closed. When the voltage on 13 is high or a "1", the closure of switch U9A permits the now-stabilized analog signal to pass via pin 2 through to the pulse width control circuit 36.

The pulse width control circuit, upon receipt of the gated-in stabilized portion of the received signal from U9A of the blanking circuit, passes that signal through a low pass filter comprising R30, R32 and C17. This circuit stores the peaks of the received signal and then applies them to pin 5 of U7B which is a follower amplifier. Its output at pin 7 is also an analog signal that is applied to control pin 5 of U16. U16 is a timer configured to operate as an analog-to-digital converter of a special type. The output signal of U16 at pin 3 comprises a series of pulses whose width changes as a function of the magnitude of the voltage on pin 5. The width of the pulses is determined, in part, by R56, R57 and C23 which are coupled to pins 7, 2 and 6 of chip U16. As the voltage of the analog signal at 5 proceeds downward from two volts, there will appear on output pin 3 pulses of increasing width. No pulses will issue from pin 3, however, because of Zener diode CR33, until the voltage at pin 5 is below two volts. The lower the voltage at pin 5 because of the increasing damping of the sensor by the rising level of liquid, the wider the pulse. The output pulses of the pulse width control at pin 3 of U16 are applied through resistor R34 to the base of transistor Q2 which is a power amplifier that amplfiies it and applies it to the solenoid L2 of output valve 12. Diode CR13 is an anti-spike device. The wider the pulses applied to valve 12, the longer the valve will open to permit more of the liquid to escape.

While the present embodiment of the invention has been described in terms of releasing predetermined portions of the body of liquid as a function of its level, it should be understood that there are applications in which the received pulses may not be used for that purpose. For example, at a certain height of the liquid, the received pulses could be processed to give a visual indication of the height of the liquid on any desired type of display, or may sound an alarm, or be used to change or stop the operation under way in the enclosure or elsewhere in the chain of connected equipment. Since the amplitude of the received signals varies as the amount of damping of the element, it is apparent that the output signals of the probe are also affected by and indicate the viscosity of the liquid.

One illustrative embodiment of the present invention which has proved successful used the following circuit components:

| RESISTORS | |
|---|---|
| R1 | 1K |
| R2 | 100K |
| R3 | 1K |
| R4 | 2.4K |
| R5 | 100K |
| R6 | 100 |
| R11 | 39K |
| R12 | 33K |
| R13 | 4.02K |
| R14 | 62K |
| R15 | 4.02K |
| R16 | 10K |
| R17 | 1K |
| R18 | 1K |
| R21 | 50K |
| R23 | 1 meg. |
| R29 | 470K |
| R30 | 1K |
| R32 | 2 meg. |
| R35 | 18 |
| R56 | 1.2 meg. |
| R57 | 3.9K |
| R71 | 4.02K |
| R72 | 10K |
| R74 | 10K |
| R76 | 1 meg. |
| R78 | 10K |

| CAPACITORS (In Microfarads) | |
|---|---|
| C8 | .01 |
| C9 | .01 |
| C12 | 1 |
| C13 | 1 |
| C14 | .01 |
| C15 | .1 |
| C16 | .1 |
| C17 | 100 |
| C23 | 10 |
| C25 | .1 |
| C26 | .1 |
| C27 | .1 |
| C28 | .1 |
| C34 | 10 pf |
| C36 | .1 |
| C39 | 68 pf |
| C42 | .1 |

| DIODES |
|---|
| All are 1N4003 except: CR351N914 |

| VALVE | |
|---|---|
| 12 | Brooks Model 5835 |

| INTEGRATED CIRCUITS | |
|---|---|
| U1 | OP.07 |
| U3 | 555 |
| U4A | 1458 |
| U4B | 1458 |
| U6 | 1458 |

-continued

| INTEGRATED CIRCUITS | |
|---|---|
| U7A | 1458 |
| U7B | 1458 |
| U9A | CD4066 |
| U10 | 555 |
| U11A | CD4030 |
| U11B | CD4030 |
| U16 | 555 |

| OTHER | |
|---|---|
| Vessel 11 | Whitey Sample Bottle |

| TRANSISTORS | |
|---|---|
| Q1 | 2N5193 |
| Q2 | 2N5193 |

| MISCELLANY | |
|---|---|
| LB5 | Light emitting diode |

What is claimed is:

1. A system for detecting the level of liquid in a hostile environment created within an enclosure in which there is a liquid body, comprising:

(a) a probe disposed within said enclosure having an element which vibrates in response to signals from an electromagnetic means and after said signals stop, (b) means for applying a first sweep frequency signal to said probe during a first predetermined interval thereby to cause said element to vibrate within a predetermined band of frequencies, (c) means coupled to said probe and to said (b) means for receiving a second signal produced in said probe by the vibration of said element during a predetermined second time interval after said first interval, said second signal having a characteristic which is a function of the height of said liquid, (d) means coupled to said (b) means and to said (c) means for regulating the discharge of predetermined portions of said liquid body in response to said second signal.

2. The system according to claim 1 wherein said enclosure includes means for letting portions of said liquid out of said enclosure, wherein said characteristic of said second signal is its amplitude which varies as an inverse function of the level of said liquid and wherein the vertical position of said probe is fixed.

3. The system according to claim 2 wherein said (d) means comprises means responsive to said second signal for producing third signal pulses whose width varies inversely according to the amplitude of said second signal and also comprises means for applying said third signal to said means for letting liquid out of said enclosure.

4. The system according to claim 1 wherein said (d) means includes means for preventing any signal from said (c) means from reaching said (d) means during the time that said first sweep frequency is applied to said probe and for a predetermined time thereafter and further wherein said (d) means produces signals in response to said second signal whose width is an inverse function of the level of said liquid and further wherein said (d) means includes valve means coupled to said enclosure for permitting said liquid to be let out of said enclosure in response to said third signals.

5. A method for detecting the level of a liquid body within an enclosure comprising:

(a) providing an electrically-energized vibrating probe within said enclosure capable of vibrating for an interval which begins following termination of the energization thereof, (b) applying first electrical signals to said probe to cause it to vibrate within first predetermined time intervals in a predetermined range of frequencies, (c) receiving second signals produced by said probe following energization thereof and within second predetermined time intervals which do not overlap said first time intervals, said second signals having a characteristic which correspond to a characteristic of said liquid and (d) processing said second signals to produce third signals for operating a utilization circuit.

6. The method according to claim 5 with the addition of the step of controlling the amount of liquid permitted to remain in said enclosure as a function of said third signals.

7. The method according to claim 6 wherein said third signals are responsive to said second signals and indicate the level of said liquid body in said enclosure.

8. The method according to claim 7 wherein said third signals are a plurality of pulses which have widths which vary as an inverse function of the level of said liquid body.

9. The method according to claim 5 wherein said first signals comprise a predetermined band of frequencies which include the normal resonant frequency of said probe, said band being periodically swept during the application thereof to said probe.

10. The method according to claim 5 wherein said second signals are produced by the vibrations of said probe after energization thereof ceases and further wherein said received second signals are processed in said step (d) first to generate an analog signal which in turn is used to generate said third signal comprising pulses whose width varies as an inverse function of the level of said liquid body.

11. The method according to claim 5 wherein said first electrical signals include a signal at the normal resonant fequency of said probe.

12. A system for detecting the level of liquid in a high pressure or high temperature environment created within an enclosure, comprising:

(a) an electromagnetically-operated probe disposed within said enclosure having an electromagnet and an element which vibrates in response to signals applied to the electromagnet, (b) a signal generating and transmitting circuit for producing a first band of signals having frequencies which include the normal resonant frequency of said element, said first band being swept at a cyclic rate and being applied to said electromagnet only during first predetermined intervals thereby causing said element to vibrate after termination of said first predetermined intervals, (c) means for receiving second signals produced by said probe during second predetermined time intervals interspersed with but not overlapping said first predetermined time intervals, (d) means for processing said second signals to produce a third analog signal, said means further including means responsive to said third analog signal for producing a fourth signal comprising a plurality of pulses whose widths vary as an inverse function of the level of said liquid, and (e) valve means associated with said vessel to which said fourth signal pulses are applied for allowing predetermined amounts of said liquid to be extracted from said vessel as a function of the widths of said pulses.

13. A liquid level probe comprising:

(a) a generally tubular member having its lower end sealed, (b) a vibrating element having one end affixed to the outside of said tubular member toward the lower end thereof, (c) at least one inductive means disposed within and toward the lower end of said tubular member and adapted, when electrically energized, to produce an electromagnetic field for causing said element to vibrate after energization of said inductive means ceases, and (d) a plurality of conductive means coupled to said inductive means within said tubular member and extending out of the upper end of said tubular member and adapted to be connected to a source of electrical signals for operating a utilization circuit.

14. The probe according to claim 13 wherein said tubular member is magnetically permeable and said element is made of metal and said element is substantially flat and extends downwardly past the end of said tubular member.

15. The probe according to claim 14 wherein said inductive means is attached to the end of a mounting rod, and wherein the upper end of said tubular member is sealed by a plug constructed to permit passage therethrough of said conductive means, said plug further being attached to the upper end of said mounting rod.

16. The probe according to claim 14 wherein said tubular member and said element are made of corrosion-resistant metal.

17. Apparatus for use in conjunction with a body of liquid within an enclosure, comprising:

(a) an electrically-energized vibrating probe having a fixed vertical position within said enclosure, said probe being constructed to vibrate substantially horizontally only, said probe being constructed to vibrate just after energization thereof ceases, (b) means for providing first signals to said probe to cause it to vibrate within a predetermined range of varying frequencies within first predetermined time intervals, (c) means for receiving second signals produced by said probe in response to its vibrations within second predetermined time intervals occurring just after energization thereof ceases, said second predetermined time intervals not overlapping said first time intervals, and (d) means for processing said second signals to produce third signals and applying them to a utilization circuit.

18. The apparatus according to claim 17 wherein said third signals indicate the extent of the damping of said vibrations of said elements by said liquid.

* * * * *